(12) United States Patent
Viswanathan et al.

(10) Patent No.: US 9,300,930 B2
(45) Date of Patent: Mar. 29, 2016

(54) MULTI-SEGMENT BRIGHTNESS COMPENSATION

(71) Applicant: Microvision, Inc., Redmond, WA (US)

(72) Inventors: P. Selvan Viswanathan, Bellevue, WA (US); Markus Duelli, Seattle, WA (US)

(73) Assignee: Microvision, Inc., Redmond, WA (US)

( * ) Notice: Subject to any disclaimer, the term of this patent is extended or adjusted under 35 U.S.C. 154(b) by 111 days.

(21) Appl. No.: 14/183,039

(22) Filed: Feb. 18, 2014

(65) Prior Publication Data

US 2015/0237316 A1 Aug. 20, 2015

(51) Int. Cl.
*H04N 5/64* (2006.01)
*H04N 9/31* (2006.01)
*G02B 26/10* (2006.01)

(52) U.S. Cl.
CPC ............ *H04N 9/3182* (2013.01); *G02B 26/101* (2013.01); *G02B 26/105* (2013.01); *H04N 9/3135* (2013.01)

(58) Field of Classification Search
CPC . H04N 9/3182; H04N 9/3135; G02B 26/101; G02B 26/105
USPC .......................................................... 348/687
See application file for complete search history.

(56) References Cited

U.S. PATENT DOCUMENTS

| 2005/0024704 A1 | 2/2005 | Sakai | |
|---|---|---|---|
| 2010/0283413 A1* | 11/2010 | Richter et al. | 315/360 |
| 2012/0120116 A1* | 5/2012 | Seo et al. | 345/690 |
| 2012/0281721 A1 | 11/2012 | DeJong et al. | |
| 2013/0003026 A1 | 1/2013 | Rothaar | |
| 2013/0050156 A1 | 2/2013 | Rothaar | |

FOREIGN PATENT DOCUMENTS

KR    10-2012-0053146    5/2012

OTHER PUBLICATIONS

Microvision, Inc., , "International Search Report and Written Opinion".

* cited by examiner

*Primary Examiner* — Michael Lee
(74) *Attorney, Agent, or Firm* — Kevin D. Wills (57) ABSTRACT

A scanning projector includes a brightness compensation component. The brightness compensation component modifies pixel brightness as a function of instantaneous scan phase of a sinusoidally scanning mirror. The brightness compensation component uses different brightness compensation functions based on whether the instantaneous scan phase is above or below a threshold. The threshold may correspond to a knee of a maximum laser power limit curve.

14 Claims, 10 Drawing Sheets

MULTI-SEGMENT BRIGHTNESS COMPENSATION

FIELD

The present invention relates generally to projection systems, and more specifically to scanning projection systems.

BACKGROUND

Scanning laser projectors typically scan a modulated laser beam in a raster pattern to display an image. Due to many possible factors, the resulting laser beam spot may traverse the raster pattern at a varying rate. For example, a sinusoidally scanned laser beam will produce a laser spot that traverses the raster pattern fastest near the center and slowest away from the center. The varying rate of laser spot traversal may result in brightness variations in the displayed image.

DETAILED DESCRIPTION

In the following detailed description, reference is made to the accompanying drawings that show, by way of illustration, various embodiments of an invention. These embodiments are described in sufficient detail to enable those skilled in the art to practice the invention. It is to be understood that the various embodiments of the invention, although different, are not necessarily mutually exclusive. For example, a particular feature, structure, or characteristic described in connection with one embodiment may be implemented within other embodiments without departing from the scope of the invention. In addition, it is to be understood that the location or arrangement of individual elements within each disclosed embodiment may be modified without departing from the scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

Figure 1:
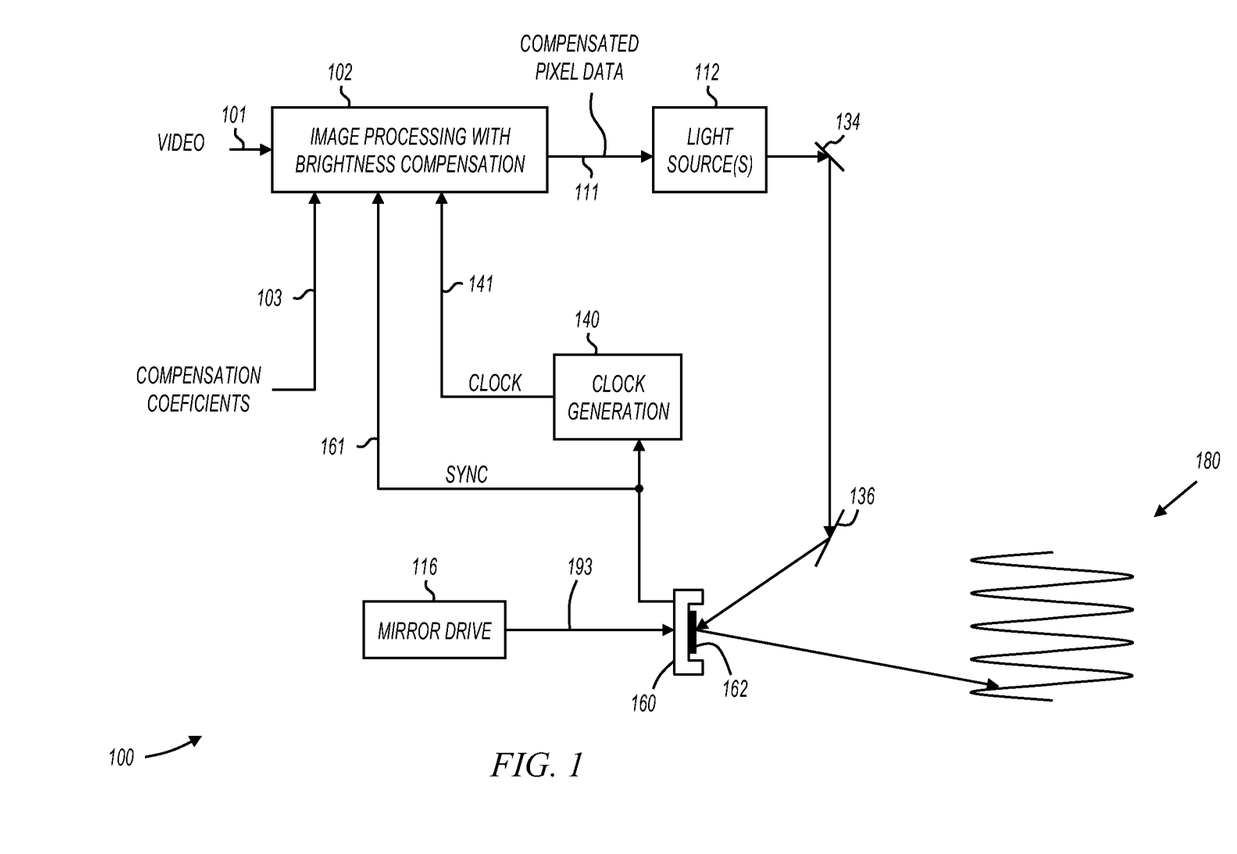
FIG. 1 shows a scanning laser projector in accordance with various embodiments of the present invention.

FIG. 1 shows a scanning laser projector in accordance with various embodiments of the present invention. Scanning laser projector 100 includes image processing component with brightness compensation 102, light source(s) 112, microelectronic machine (MEMS) device 160 having scanning mirror 162, mirror drive circuits 116, and clock generation component 140. Scanning laser projector 100 also includes guiding optics 134 and 136.

In operation, image processing component with brightness compensation 102 receives video data on node 101 and produces compensated pixel data on node 111 used to drive light source(s) 112 when pixels are to be displayed. The video data on node 101 represents image source data that is typically received with pixel data on a rectilinear grid, but this is not essential. For example, video data on node 101 may represent a grid of pixels at any resolution (e.g., 640×480, 848×480, 1920×1080). Scanning laser projector 100 is a scanning projector that scans a raster pattern shown at 180. The raster pattern does not necessarily align with the rectilinear grid in the image source data, and image processing component 102 operates to produce display pixel data that will be displayed at appropriate points on the raster pattern. For example, in some embodiments, image processing component 102 interpolates vertically and/or horizontally between pixels in the source image data to determine display pixel values along the scan trajectory of the raster pattern.

Light source(s) 112 receive the compensated pixel data output from image processing component 102, and produce light having grayscale values in response thereto. Light source(s) 112 may be monochrome or may include multiple different color light sources. For example, in some embodiments, light source(s) 112 includes red, green, and blue light sources. In these embodiments, image processing component 102 outputs compensated pixel data corresponding to each of the red, green, and blue light sources.

In some embodiments, light source(s) 112 may include one or more laser light producing devices. For example, in some embodiments, the light source(s) 112 may include laser diodes. In these embodiments, light source(s) 112 may also include driver circuits that accept and/or condition drive signals. For example, driver circuits may include digital-to-analog (D/A) converters, transimpedance amplifiers, coupling circuits, bias circuits, switches, and the like. Light beam(s) from light source(s) 112 are directed to mirror 162 via guiding optics 134, 136. Any type of optical element may be included in the light path between light source(s) 112 and mirror 162. For example, scanning laser projector 100 may include collimating lenses, dichroic mirrors, or any other suitable optical elements.

Scanning mirror 162 is positioned to receive the light beam(s) from light source(s) 112. In some embodiments, scanning mirror 162 is a sinusoidally scanning mirror that scans sinusoidally on at least one axis. Further, in some embodiments, scanning mirror 162 scans back and forth and has an instantaneous scan phase that sweeps through a zero phase value and positive and negative video extents phase values.

Scanning mirror 162 deflects on two axes in response to electrical stimuli received on node 193 from mirror drive circuits 116. While moving on the two axes, scanning mirror 162 reflects light provided by light source(s) 112. The reflected light sweeps a raster pattern and paints individual pixels as the light beams are modulated, resulting in an image display at 180. The shape of the raster pattern swept by scanning mirror 162 is a function of the mirror movement on its two axes. For example, in some embodiments, scanning mirror 162 sweeps in a first dimension (e.g., horizontal dimension) according to a sinusoidal stimulus, resulting in a substantially sinusoidal horizontal sweep. Also for example, in some embodiments, scanning mirror 162 sweeps in a second dimension (e.g., vertical dimension) in response to sawtooth wave stimulus, resulting in a substantially linear and unidirectional vertical sweep.

MEMS device 160 is an example of a scanning mirror assembly that scans light in two dimensions. In some embodiments the scanning mirror assembly includes a single mirror that scans in two dimensions (e.g., on two axes). Alternatively, in some embodiments, MEMS device 160 may be an assembly that includes two scan mirrors, one which deflects the beam along one axis, and another which deflects the beam along a second axis largely perpendicular to the first axis.

MEMS device 160 produces a sync signal on node 161. The sync signal on node 161 provides information regarding mirror position. For example, in some embodiments, the sync signal is a horizontal sync signal that transitions a known number of times per horizontal sweep of scanning mirror 162, and in other embodiments, the sync signal is a vertical sync signal that transitions a known number of times per vertical sweep of scanning mirror 162. In some embodiments, MEMS device 160 includes sensors and/or circuits to generate the sync signal. For example, in some embodiments, MEMS device 160 includes one or more piezoelectric sensors that sense the position of scanning mirror 162. Also for example, in some embodiments, MEMS device 160 also includes one or more comparators, delay lines, or other circuits to generate the sync signal from sensor signals.

Clock generation component 140 receives the sync signal on node 161 and generates a clock signal on node 141. Clock generation component 140 may include any circuits capable of generating a clock signal from a sync signal. For example, in some embodiments, clock generation component 140 includes a phase lock loop circuit having a phase comparator, voltage controlled oscillator, frequency multipliers and/or dividers, and the like. In some embodiments, the clock signal on node 141 is a pixel clock that is used to time pixel data generation and display of pixels in the image displayed at 180.

Image processing component 102 also includes a brightness compensation component configured to modify brightness of the light beam produced by light source(s) 112. The brightness compensation component makes use of the compensation coefficients on node 103, the sync signal on node 161, and the clock signal on node 141 to determine when and how to modify pixel brightness. In some embodiments, the brightness compensation component uses at least two functions of the instantaneous scan phase, where a first function is used when the instantaneous scan phase is equal to the zero phase value at the horizontal center of raster pattern 180, and a second function is used when an absolute value of the instantaneous scan phase is equal to the positive video extents phase value. These brightness compensation embodiments and others are described further below.

Figure 2:
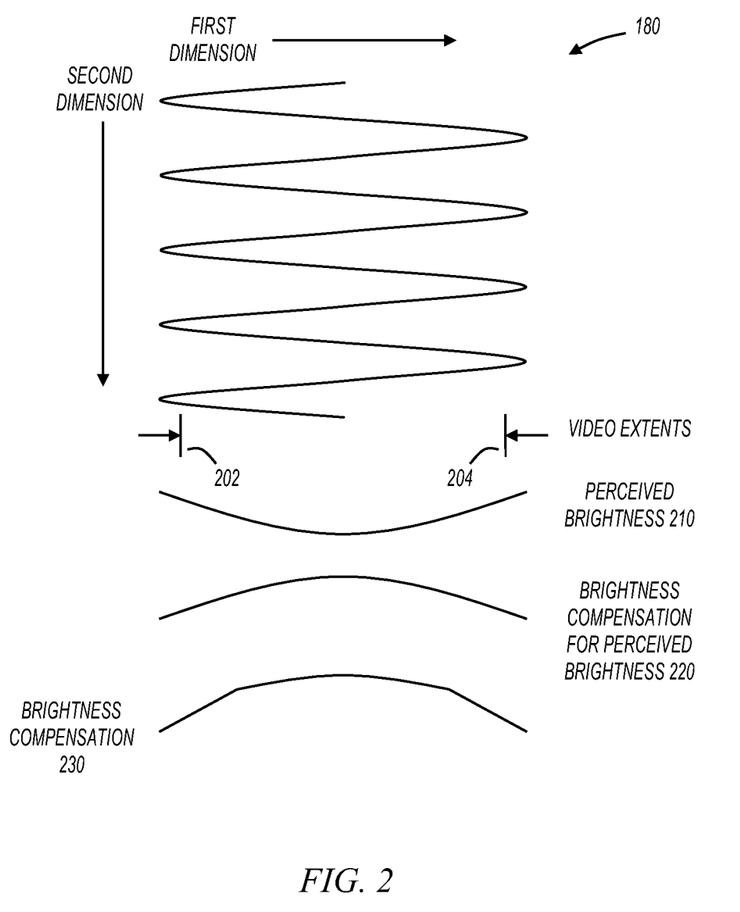
FIG. 2 shows a raster pattern with brightness variations in accordance with various embodiments of the present invention.

FIG. 2 shows a raster pattern with brightness variations in accordance with various embodiments of the present invention. Raster pattern 180 is also shown in, and described with reference to, FIG. 1. Although raster pattern 180 shows only a few horizontal sweeps for each vertical sweep, this is not a limitation of the present invention. For example, in some embodiments, hundreds or thousands of horizontal sweeps occur for each vertical sweep.

FIG. 2 shows the horizontal direction as the "first dimension," and the vertical direction as the "second dimension." This is for naming convention purposes only, and a 90 degree rotation can result in the first dimension being the vertical direction and the second dimension being the horizontal direction.

FIG. 2 also shows negative video extent 202 and positive video extent 204 in the fast scan direction. Video extents 202, 204 represent the extent of the raster pattern that is used to display video. Pixels are displayed between the extents but not outside the extents. If the horizontal (fast scan) center is considered to be zero phase, scanning mirror 162 (FIG. 1) scans through the zero phase position, the negative video extent position 202, and the positive video extent position 204.

In a scanned beam projection system (100, FIG. 1) with a resonant mirror drive for the fast axis, the scanning mirror motion is inherently fastest at the center of the fast scan extents (zero phase position) and the scanning mirror slows down towards the edges of the image field of view. As the scanning mirror slows down towards the edges, the pixel period duration increases. If the light sources are driven to a fixed power level for all pixel locations, the pixels appear brighter at the edges of the field of view and dimmer towards the center.

This phenomenon is represented by the perceived brightness curve at 210. Perceived brightness 210 represents the increased brightness near the left and right edges of the raster pattern that results if the light sources are driven with a fixed power level for all pixel locations. Because the mirror velocity can be approximated by a cosine curve, perceived brightness 210 is also represented by a cosine curve having increased brightness near the video extents as a result of sinusoidal scanning in the first dimension.

In some embodiments, a brightness compensation shown at 220 is applied to the pixel data to compensate for the perceived brightness shown at 210. Brightness compensation 220 modifies or adjusts the brightness of individual pixels based on horizontal distance from a center of the image. For example, for a brightness compensation normalized to a value of one, the brightness of individual pixels is not modified or adjusted at the horizontal center of the image. For the same brightness compensation normalized to a value of one, the brightness of individual pixels is reduced as the distance increases from the horizontal center of the image.

FIG. 2 also shows brightness compensation 230. Brightness compensation 230 is an example of a multi-segment brightness compensation function. Multi-segment brightness compensation may be useful for many purposes. In some embodiments, as the combined output laser power is increased, total instantaneous output power must still remain below a certain laser power limit in order to satisfy a certain laser classification. Examples of some laser classifications are described further below. Some embodiments of the present invention provide multi-segment brightness compensation that uses a plurality of different brightness compensation functions in order to increase overall image brightness while remaining within the same laser class. A first brightness compensation function may be used for horizontal distances associated with an instantaneous scan phase below a threshold, and a second brightness compensation function may used for horizontal distances associated with instantaneous phase values above the threshold.

Although multi-segment brightness compensation is useful for satisfying laser classifications as described above, in some embodiments, multi-segment brightness compensation is used for other purposes. For example, brightness variations may stem from projection geometry as well as the varying mirror scan speed. If a projection surface is irregular, or if the projector is not nominally orthogonal to the projection surface, multi-segment brightness variations may result. In these embodiments, multi-segment brightness compensation may be used to modify pixel brightness to effect any desired relationship between uncompensated pixel data and compensated pixel data.

Figure 3:
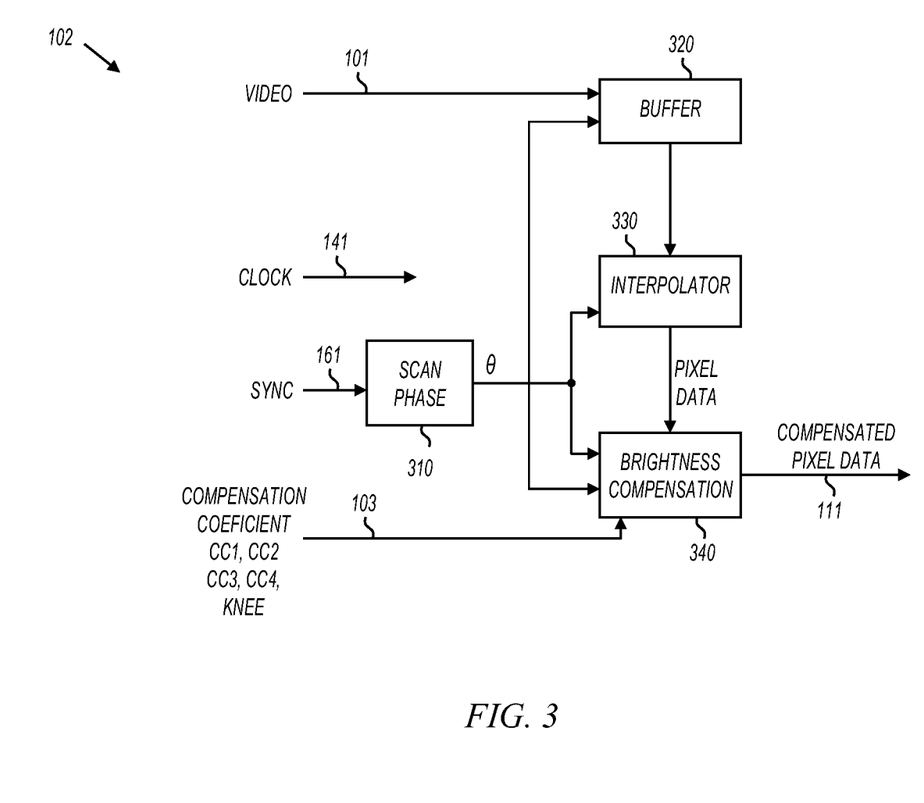
FIG. 3 shows an image processing component with brightness compensation in accordance with various embodiments of the present invention.

FIG. 3 shows an image processing component with brightness compensation in accordance with various embodiments of the present invention. Image processing component 102 includes video buffer 320, interpolator 330, scan phase determination component 310, and brightness compensation component 340. The clock signal on node 141 is shown with one arrow to signify that it is provided to any functional block that uses it. For example, in some embodiments, the clock signal is provided to all other functional blocks depicted in FIG. 3.

Scan phase determination component 310 receives a sync signal on node 161 and outputs an instantaneous scan phase value θ that represents the instantaneous scan phase of the scanning mirror. The sync signal may be any signal or signals that allows the instantaneous scan phase value to be determined. For example, in some embodiments, the sync signal is a vertical sync signal, and in other embodiments, the sync signal is a horizontal sync signal. Scan phase determination component 310 may determine the instantaneous scan phase in any suitable manner. For example, in some embodiments, scan phase determination component 310 implements a modulo it counter that adds a fixed phase value for every clock period.

Video buffer 320 receives video data on node 101. As described above, the video data may be in any format, including at any color depth and resolution. Buffer 320 stores multiple entries corresponding to multiple pixels. In some embodiments, buffer 320 stores one horizontal line worth of pixels, and in other embodiments, buffer 320 stores multiple horizontal lines worth of pixels. In still further embodiments, buffer 320 stores a complete frame of pixels, or multiple frames of pixels.

Buffer 320 may be implemented using any suitable hardware structure. For example, in some embodiments, buffer 320 is implemented with a dual-port random access memory, and in other embodiments, buffer 320 is implement with a first-in-first-out (FIFO) storage device.

Interpolator 330 receives pixel data from buffer 320, and performs interpolation to determine display pixel values that correspond to the instantaneous scan phase value of the scanning mirror. In some embodiments, interpolator 330 interpolates only between pixels on a single horizontal or vertical line (one dimensional interpolation), an in other embodiments, interpolator 330 interpolates between pixels on the same horizontal line as well as between pixels on different horizontal lines (two dimensional interpolation).

Interpolator 330 may be implemented using any suitable hardware structure. For example, in some embodiments, interpolator 330 is implemented with registers, adders, shifters, and multipliers. Interpolator 330 may also include embedded control components such as finite state machines to control the various computational elements used to perform the interpolation between pixels in buffer 320.

The interpolated pixel data is provided to brightness compensation component 340. Brightness compensation component 340 modifies the output brightness of pixels as a function of the instantaneous scan phase value θ. As described above, the mirror velocity can be approximated by a cosine curve and following from that a brightness compensation factor may be defined as:

$$\text{brightness\_compensation} = BF + ((1-BF) * \cos(\theta)),$$

where BF is a brightness factor that takes on a value between 0 and 1 (1=no brightness compensation). For a pixel at θ, the output pixel laser power is computed as:

$$\text{compensated pixel data} = \text{pixel data} * \text{brightness\_compensation}.$$

In other embodiments, the brightness compensation follows a multi-segment approach. For example, the brightness compensation may be determined using a first function when the absolute value of θ is below a threshold, and may be determined using a second function when the absolute value of θ is above the threshold. In these embodiments, the brightness compensation factor may be defined as:

if abs(θ)<knee $$\text{brightness\_compensation} = (CC1*CC2) + (1-CC1)*\cos(\theta)$$

else $$\text{brightness\_compensation} = (CC3*CC4) + (1-CC3)*\cos(\theta)$$

where CC1, CC2, CC3, and CC4 are compensation coefficients, and "knee" is a threshold. Various multi-segment embodiments include more than one threshold and more than two functions of θ to determine brightness compensation factors. Any number of thresholds and brightness compensation functions may be included without departing from the scope of the present invention.

In some embodiments, the compensation coefficients are static values that are set once and do not change. In other embodiments, the compensation coefficients may be modifiable during operation of the scanning laser projection. For example, the compensation coefficients may be held in registers that are modifiable by a control component (not shown) such as a microprocessor or finite state machine. The compensation coefficients may be modified when a user interacts with the laser projector (e.g., when a user modifies a brightness setting), or they may be modified using an algorithm within a control component in the absence of user interaction.

As described further below, some embodiments employ multi-segment brightness compensation to increase output lumens of a scanning laser projector while remaining within the same laser class. Further, other embodiments employ multi-segment brightness compensation to make other value-added trade offs in display quality, such as brightness uniformity versus average output power. And still further embodiments employ multi-segment brightness compensation to compensate for brightness variations due to projection geometry.

Figure 4:
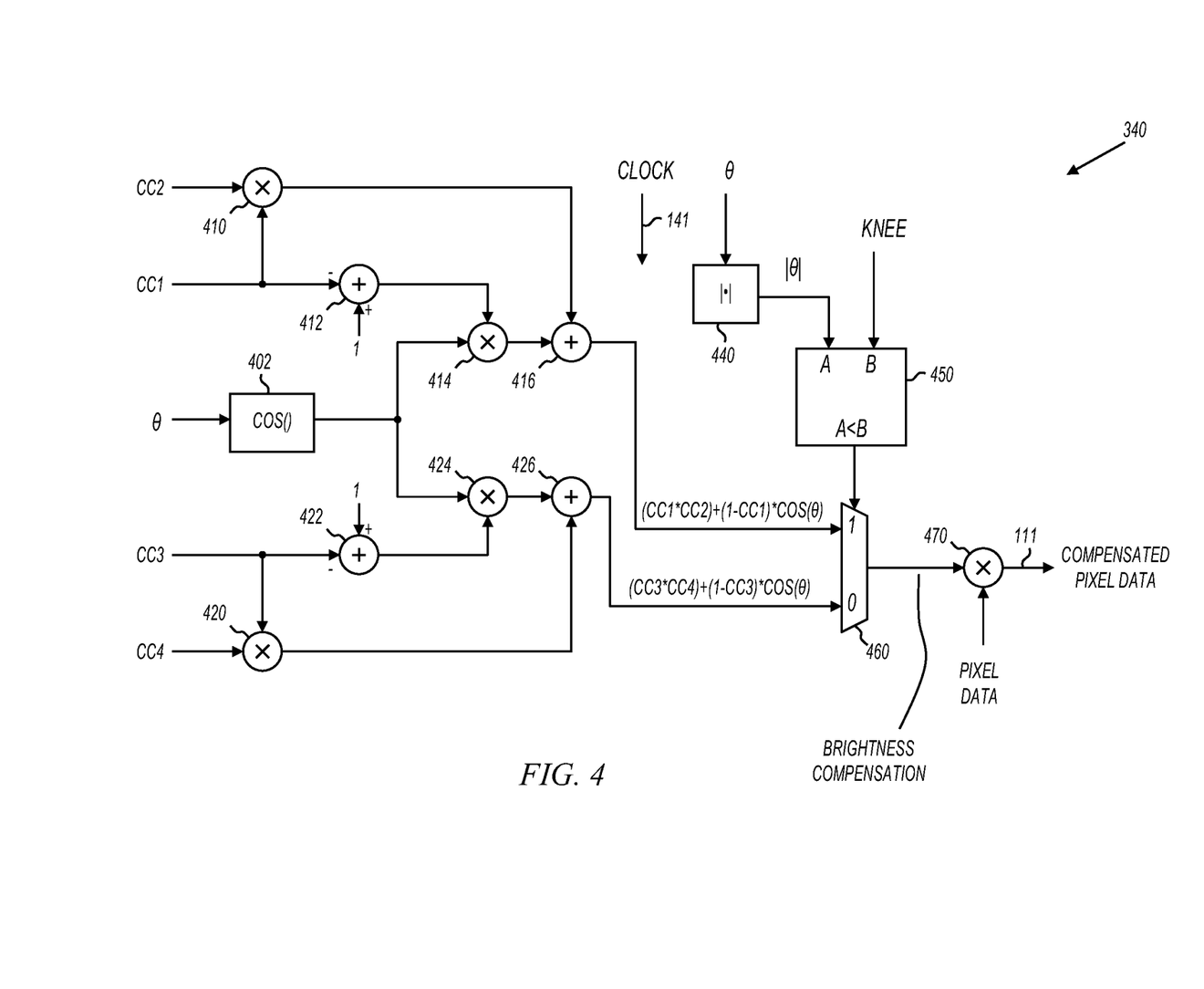
FIG. 4 shows a brightness compensation component in accordance with various embodiments of the present invention.

FIG. 4 shows a brightness compensation component in accordance with various embodiments of the present invention. Brightness compensation component 340 includes multipliers 410, 414, 420, 424, and 470, adders 412, 416, 422, and 426, cosine determination component 402, absolute value determination component 440, comparator 450, and multiplexer 460. The clock signal on node 141 is shown with one arrow to signify that it is provided to any functional block that uses it. For example, in some embodiments, the clock signal is provided to all other functional blocks depicted in FIG. 4.

The example circuit topology shown in FIG. 4 performs multi-segment brightness compensation in accordance with the multi-segment example provide above with reference to FIG. 3. As shown in FIG. 4, the two functions include different coefficients applied to trigonometric functions of the instantaneous scan phase. The different coefficients are shown as (1−CC1) and (1−CC3), and the trigonometric functions are cosine functions. Also as shown in FIG. 4, the two functions include different offsets summed with trigonometric functions of the instantaneous scan phase. The different offsets are shown as (CC1*CC2) and (CC3*CC4), and the trigonometric functions are cosine functions.

Multiplier 470 is shown as a single multiplier that multiplies pixel data with the brightness compensation. In some embodiments, multiplier 470 includes more than one physical multiplier. For example, some embodiments include three multipliers, where each multiplier applies the brightness compensation factor to a different color pixel data (e.g., red, green and blue).

Although FIG. 4 shows multi-segment brightness compensation with a single threshold, this is not a limitation of the present invention. For example, some embodiments include multi-segment brightness compensation with more than one threshold.

Figure 5:
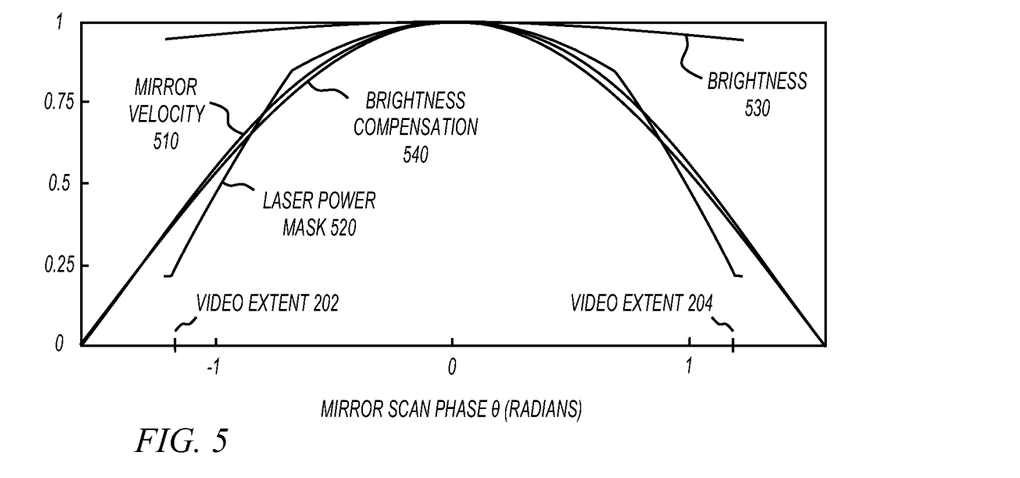
FIGS. 5 and 6 show plots of brightness compensation using a single compensation function.
Figure 6:
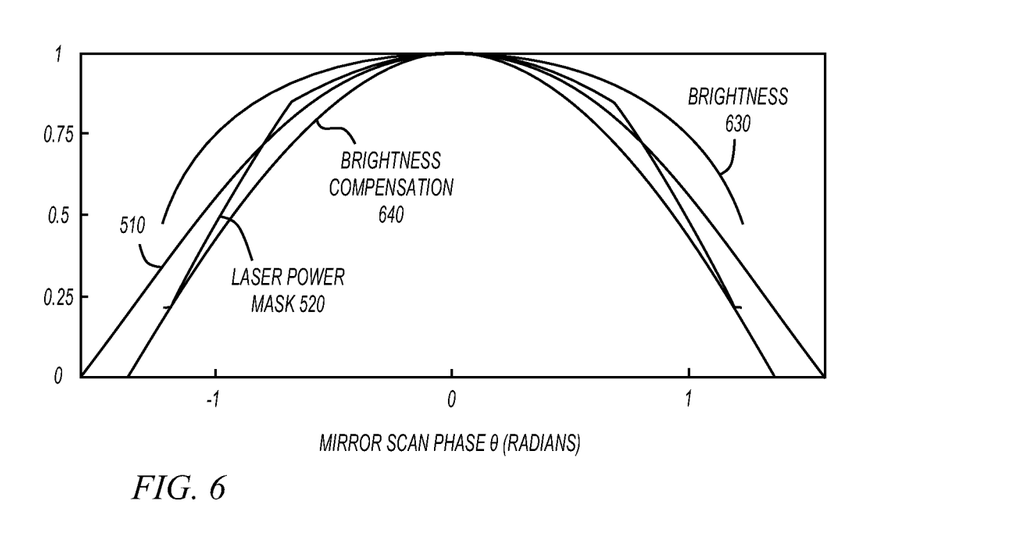

FIGS. 5 and 6 show plots of brightness compensation using a single compensation function. FIG. 5 shows mirror velocity 510, brightness compensation 540, brightness uniformity 530, and laser power mask 520, all as a function of the instantaneous mirror scan phase value θ. FIG. 5 also shows positive video extent 204 and negative video extent 202. The active video extents in this example are out to approximately +/−1.2 radians (or 94% of scan range is reserved for active video). All curves shown in FIG. 5 are normalized to a value of one for simplicity.

The laser power mask 520 represents a maximum desirable laser power as a function of instantaneous scan phase. Laser power mask 520 may be derived using any criteria, including but not limited to: laser class, projection geometry, projection surface discontinuities, and the like. For the sake of discussion, and to provide a concrete example, laser power mask 520 is in the shape of a Class 2 IEC 60825-1 laser power limits for a ~26 lumen system.

Brightness compensation 540 is a single segment brightness function of the form:

$$\text{brightness\_compensation} = BF + ((1-BF)*\cos(\theta)),$$

where BF=0.

Brightness 530 shows the brightness uniformity of the final image formed when the brightness compensation 540 is applied. When brightness compensation 540 is applied, peak brightness variation (variation of brightness uniformity 530) equals 5.17%, and 13 point ANSI uniformity equals 97.34%. Brightness compensation 540 is outside (above) the limit bounds specified by the laser power mask 520 on both the left and right side of the scan extents. In general, this implies output laser power above the desirable limits as specified by mask 520, and in this specific example, this implies a violation of Class 2 IEC limits.

FIG. 6 also shows single segment brightness compensation. In contrast to the brightness compensation shown in FIG. 5, the brightness compensation 640 in FIG. 6 remains below the laser power mask 520, and therefore satisfies a particular laser class requirement.

Brightness compensation 640 is a single segment brightness function of the form:

$$\text{brightness\_compensation} = BF + ((1-BF)*\cos(\theta)),$$

where BF=−0.263.

Brightness 630 shows the brightness uniformity of the final image formed when the brightness compensation 640 is applied. When brightness compensation 640 is applied, peak brightness variation (variation of brightness uniformity 630) equals 52.78%, and 13 point ANSI uniformity equals 71.13. Brightness compensation 640 results in a system that remains in a certain laser class, but overall brightness and brightness uniformity are reduced as compared to brightness compensation 540 (FIG. 5).

Figure 7:
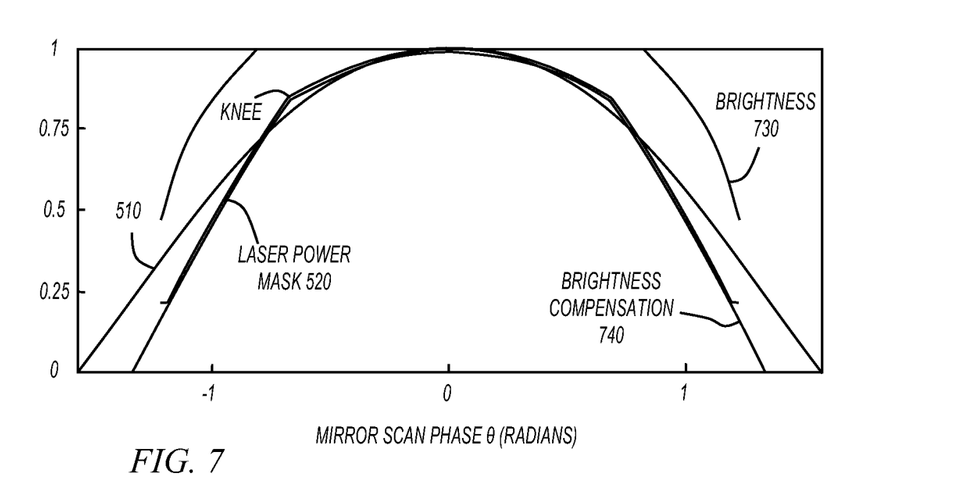
FIG. 7 shows a plot of brightness compensation using more than one compensation function.

FIG. 7 shows a plot of brightness compensation using more than one compensation function. Brightness compensation 740 provides multi-segment brightness compensation of the form:

if abs(θ)<knee $$\text{brightness\_compensation} = (CC1*CC2) + (1-CC1)*\cos(\theta)$$

else $$\text{brightness\_compensation} = (CC3*CC4) + (1-CC3)*\cos(\theta),$$

where
CC1=0.314;
CC2=1.0;
CC3=−0.552;
CC4=0.654; and
knee=0.681.

Brightness compensation 740 increases total lumens output and also increases brightness uniformity by increasing the laser power drive while remaining under the laser power mask 520. The example laser power mask 520 includes a knee, and brightness compensation 740 determines brightness compensation using a first function when the absolute value of the instantaneous mirror scan phase value θ is below the knee, and determines brightness compensation using a first function when the absolute value of the instantaneous mirror scan phase value θ is above the knee.

When brightness compensation 640 is applied, peak brightness variation (variation of brightness uniformity 730) equals 52.57%, and 13 point ANSI uniformity equals 70.91. The multi-segment brightness compensation of FIG. 7 provides a gain of an additional ~7% of output lumens over the single segment approach of FIG. 6 with nearly no loss of brightness uniformity.

In the example of FIG. 7, brightness compensation 740 uses two functions of θ. The number of functions used can be limitless for increased granularity, but for simplicity only two are considered here.

Figure 8:
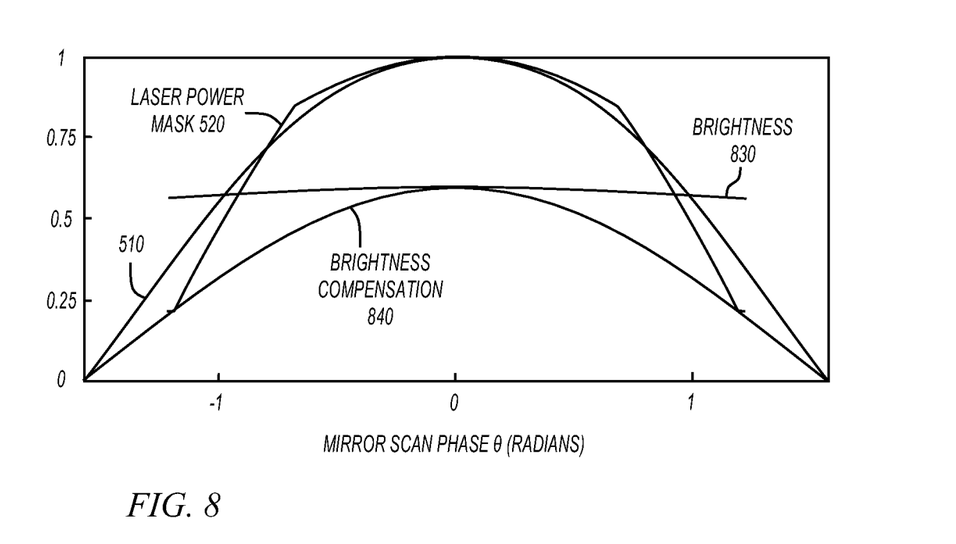
FIG. 8 shows a plot of brightness compensation using more than one compensation function at lower brightness levels.

FIG. 8 shows a plot of brightness compensation using more than one compensation function at lower brightness levels. Brightness compensation 840 provides multi-segment brightness compensation of the form:

if abs(θ)<knee $$\text{brightness\_compensation} = (CC1*CC2) + (1-CC1)*\cos(\theta)$$

else $$\text{brightness\_compensation} = (CC3*CC4) + (1-CC3)*\cos(\theta),$$

where
CC1=CC2=CC4=0;
CC3=−0.409; and
knee=0.

The output lumens drop to about ~15, peak brightness variation drops to 3.06%, and 13 point ANSI uniformity increases to 97.34%.

In some embodiments, the compensation coefficients are dynamically modified as the system brightness is varied between values represented by FIGS. 7 and 8. For example, the knee may be increased or decreased as the system brightness is varied. Also for example, CC1, CC2, CC3, and CC4 may be increased or decreased as the system brightness is varied.

FIG. 8 represents an embodiment that increases brightness uniformity 830 in return for reduced total output lumens. Other embodiments may modify the compensation coefficients to make different tradeoffs between output lumens, brightness uniformity, and other factors.

As discussed above, laser power mask 520 may be derived using any criteria, including criteria related to IEC laser classes or classification. For example, in some embodiments, laser power or class limits might not be an issue depending on the product industrial design and the power levels to which the lasers are driven to in that application. However, what might be more applicable in these scenarios is a power limits mask that is derived from the geometry of the surface onto which the image is projected.

Consider a projection scenario in which laser projector 100 (FIG. 1) projects signage onto a surface that is convex with the projector nominally orthogonal to the center of the convex surface. In these embodiments, the projected content will fade to the sides from the center. In these embodiments, a laser power limit mask may be derived that allows for increasing brightness towards the edges while keeping brightness at the center nominally maximum. As the pixel period increases near the video extents, the perceived brightness towards the edge increases. In embodiments in which the projector is not nominally orthogonal to the projection surface, multiple scan phase thresholds may be employed to alter the perceived brightness distribution.

Consider another projection scenario, in which laser projector 100 (FIG. 1) projects onto a multi-segment projection surface. Segment 1 on the left and Segment 3 on the right are at the same distance from the projector and Segment 2 is in the center but further away from the projector than the other two segments. In these embodiments, a laser power limits mask may be derived so the brightness at the center is maximum, while pushing the brightness lower towards the edges, allowing for what appears to be a constantly bright image. In embodiments in which the segment thresholds are not equidistant from the center, the laser power limits mask may have multiple thresholds and not employ the absolute value block 440 in FIG. 4.

Figure 9:
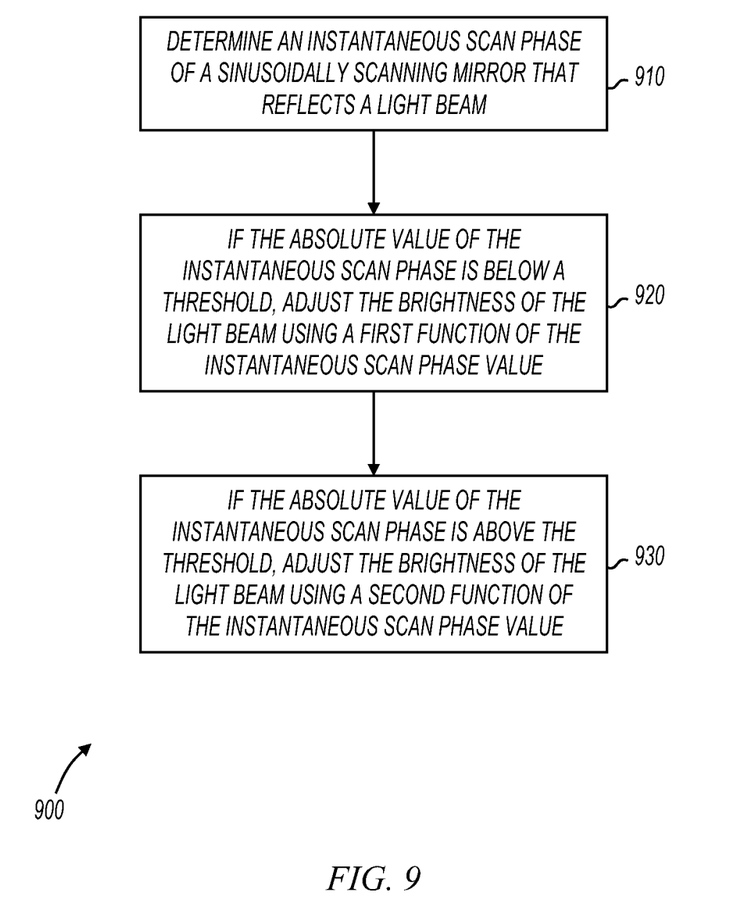
FIG. 9 shows a flowchart of methods in accordance with various embodiments of the present invention.

FIG. 9 shows a flow diagram of methods in accordance with various embodiments of the present invention. In some embodiments, method 900, or portions thereof, is performed by a scanning laser projector, embodiments of which are shown in previous figures. In other embodiments, method 900 is performed by a series of circuits or an electronic system. In some embodiments, method 900 compensates the brightness of individual pixels in a display image. Method 900 is not limited by the particular type of apparatus performing the method. Further, in some embodiments, some actions listed in FIG. 9 are omitted from method 900.

Method 900 is shown beginning with block 910. As shown at 910, an instantaneous scan phase of a sinusoidally scanning mirror that reflects a light beam is determined. In some embodiments, this may be performed by summing a fixed phase increment for each clock period, and synchronizing to a vertical or horizontal sync signal produced by the scanning mirror.

At 920, the brightness of the light beam is adjusted using a first function of the instantaneous scan phase value if the absolute value of the instantaneous scan phase is below a threshold. In some embodiments, the threshold corresponds to a knee of a laser class' maximum laser power curve.

At 930, the brightness of the light beam is adjusted using a second function of the instantaneous scan phase value if the absolute value of the instantaneous scan phase is above the threshold.

In some embodiments, the first and second functions differ by coefficients applied to a trigonometric function of the instantaneous scan phase value. In other embodiments, the first and second functions include different offsets summed with a trigonometric function of the instantaneous scan phase value.

Figure 10:
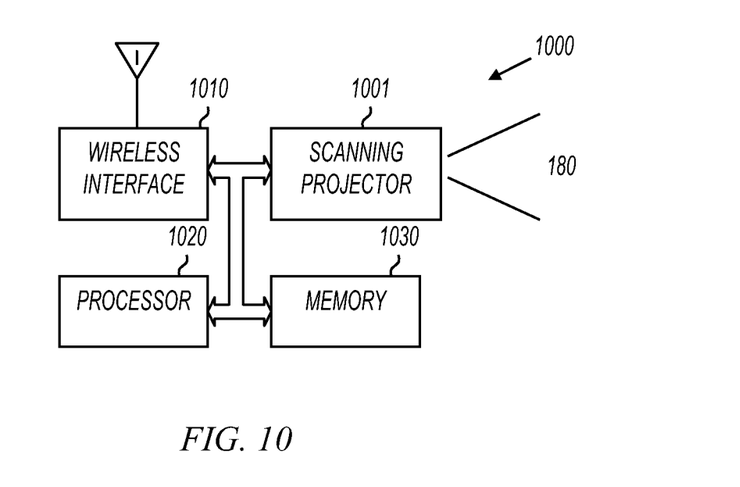
FIG. 10 shows a block diagram of a mobile device in accordance with various embodiments of the present invention.

FIG. 10 shows a block diagram of a mobile device in accordance with various embodiments of the present invention. As shown in FIG. 10, mobile device 1000 includes wireless interface 1010, processor 1020, memory 1030, and scanning projector 1001. Scanning projector 1001 paints a raster image at 180. Scanning projector 1001 is a scanning laser projector as described above with reference to previous figures. For example, scanning projector 1001 may include a brightness compensation component as describe above. The brightness compensation component may perform brightness compensation using one or more brightness functions, and may include multi-segment brightness compensation as described herein.

Scanning projector 1001 may receive image data from any image source. For example, in some embodiments, scanning projector 1001 includes memory that holds still images. In other embodiments, scanning projector 1001 includes memory that includes video images. In still further embodiments, scanning projector 1001 displays imagery received from external sources such as connectors, wireless interface 1010, a wired interface, or the like.

Wireless interface 1010 may include any wireless transmission and/or reception capabilities. For example, in some embodiments, wireless interface 1010 includes a network interface card (NIC) capable of communicating over a wireless network. Also for example, in some embodiments, wireless interface 1010 may include cellular telephone capabilities. In still further embodiments, wireless interface 1010 may include a global positioning system (GPS) receiver. One skilled in the art will understand that wireless interface 1010 may include any type of wireless communications capability without departing from the scope of the present invention.

Processor 1020 may be any type of processor capable of communicating with the various components in mobile device 1000. For example, processor 1020 may be an embedded processor available from application specific integrated circuit (ASIC) vendors, or may be a commercially available microprocessor. In some embodiments, processor 1020 provides image or video data to scanning projector 1001. The image or video data may be retrieved from wireless interface 1010 or may be derived from data retrieved from wireless interface 1010. For example, through processor 1020, scanning projector 1001 may display images or video received directly from wireless interface 1010. Also for example, processor 1020 may provide overlays to add to images and/or video received from wireless interface 1010, or may alter stored imagery based on data received from wireless interface 1010 (e.g., modifying a map display in GPS embodiments in which wireless interface 1010 provides location coordinates).

Figure 11:
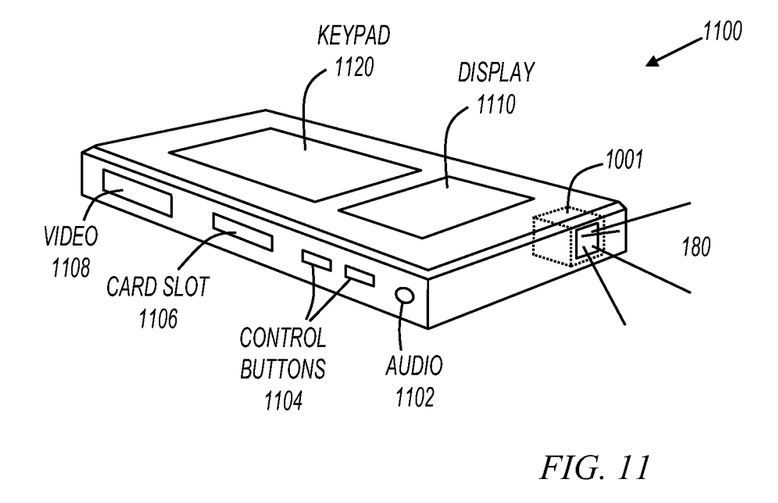
FIG. 11 shows a mobile device in accordance with various embodiments of the present invention.

FIG. 11 shows a mobile device in accordance with various embodiments of the present invention. Mobile device 1100 may be a hand held projection device with or without communications ability. For example, in some embodiments, mobile device 1100 may be a handheld projector with little or no other capabilities. Also for example, in some embodiments, mobile device 1100 may be a device usable for communications, including for example, a cellular phone, a smart phone, a personal digital assistant (PDA), a global positioning system (GPS) receiver, or the like. Further, mobile device 1100 may be connected to a larger network via a wireless (e.g., WiMax) or cellular connection, or this device can accept data messages or video content via an unregulated spectrum (e.g., WiFi) connection.

Mobile device 1100 includes scanning projector 1001 to create an image with light at 180. Mobile device 1100 also includes many other types of circuitry; however, they are intentionally omitted from FIG. 11 for clarity.

Mobile device 1100 includes display 1110, keypad 1120, audio port 1102, control buttons 1104, card slot 1106, and audio/video (A/V) port 1108. None of these elements are essential. For example, mobile device 1100 may only include scanning projector 1001 without any of display 1110, keypad 1120, audio port 1102, control buttons 1104, card slot 1106, or A/V port 1108. Some embodiments include a subset of these elements. For example, an accessory projector product may include scanning projector 1001, control buttons 1104 and A/V port 1108.

Display 1110 may be any type of display. For example, in some embodiments, display 1110 includes a liquid crystal display (LCD) screen. Display 1110 may always display the same content projected at 180 or different content. For example, an accessory projector product may always display the same content, whereas a mobile phone embodiment may project one type of content at 180 while displaying different content on display 1110. Keypad 1120 may be a phone keypad or any other type of keypad.

A/V port 1108 accepts and/or transmits video and/or audio signals. For example, A/V port 1108 may be a digital port, such as a high definition multimedia interface (HDMI) interface, that accepts a cable suitable to carry digital audio and video data. Further, A/V port 1108 may include RCA jacks to accept composite inputs. Still further, A/V port 1108 may include a VGA connector to accept analog video signals. In some embodiments, mobile device 1100 may be tethered to an external signal source through A/V port 1108, and mobile device 1100 may project content accepted through A/V port 1108. In other embodiments, mobile device 1100 may be an originator of content, and A/V port 1108 is used to transmit content to a different device.

Audio port 1102 provides audio signals. For example, in some embodiments, mobile device 1100 is a media player that can store and play audio and video. In these embodiments, the video may be projected at 180 and the audio may be output at audio port 1102. In other embodiments, mobile device 1100 may be an accessory projector that receives audio and video at A/V port 1108. In these embodiments, mobile device 1100 may project the video content at 180, and output the audio content at audio port 1102.

Mobile device 1100 also includes card slot 1106. In some embodiments, a memory card inserted in card slot 1106 may provide a source for audio to be output at audio port 1102 and/or video data to be projected at 180. Card slot 1106 may receive any type of solid state memory device, including for example, Multimedia Memory Cards (MMCs), Memory Stick DUOS, secure digital (SD) memory cards, and Smart Media cards. The foregoing list is meant to be exemplary, and not exhaustive.

Control buttons 1104 may be used for any purpose. For example, in some embodiments, control buttons 1104 may be used to navigate a menu system on display 1110.

Figure 12:
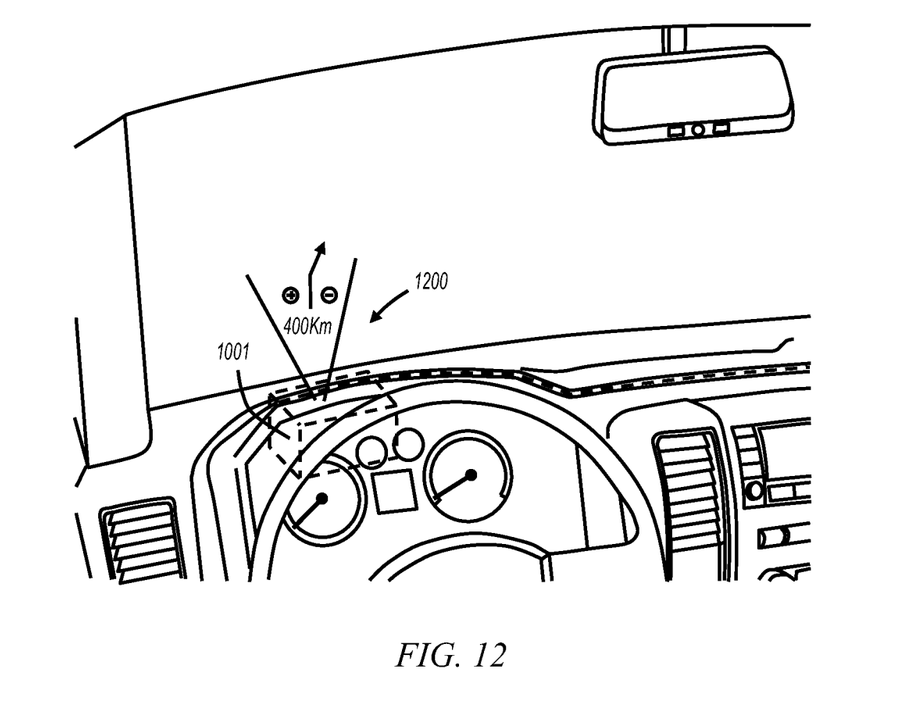
FIG. 12 shows a head-up display system in accordance with various embodiments of the invention.

FIG. 12 shows a head-up display system in accordance with various embodiments of the invention. Projector 1001 is shown mounted in a vehicle dash to project the head-up display at 1200. Although an automotive head-up display is shown in FIG. 12, this is not a limitation of the present invention. For example, various embodiments of the invention include head-up displays in avionics application, air traffic control applications, and other applications.

Figure 13:
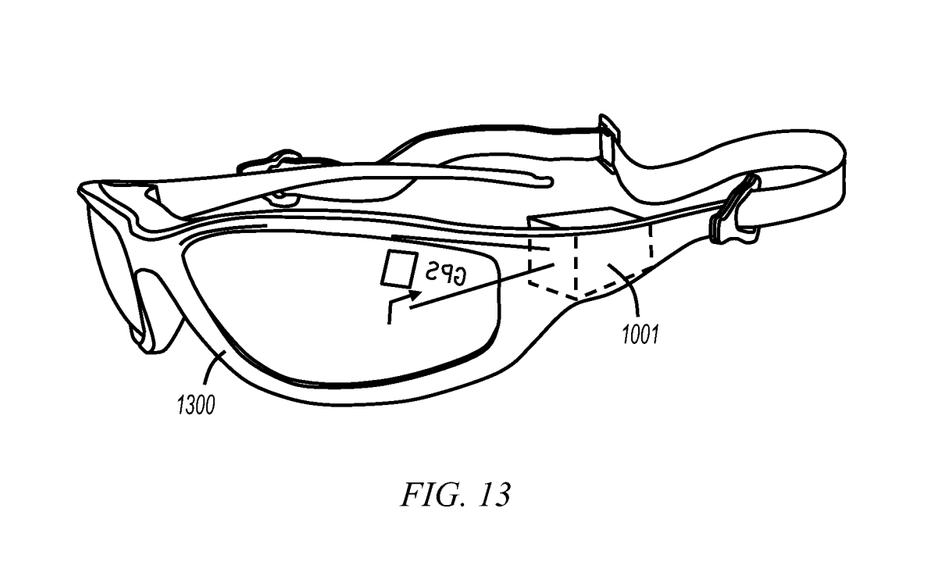
FIG. 13 shows eyewear in accordance with various embodiments of the invention.

FIG. 13 shows eyewear in accordance with various embodiments of the invention. Eyewear 1300 includes projector 1001 to project a display in the eyewear's field of view. In some embodiments, eyewear 1300 is see-through and in other embodiments, eyewear 1300 is opaque. For example, eyewear 1300 may be used in an augmented reality application in which a wearer can see the display from projector 1001 overlaid on the physical world. Also for example, eyewear 1300 may be used in a virtual reality application, in which a wearer's entire view is generated by projector 1001. Although only one projector 1001 is shown in FIG. 13, this is not a limitation of the present invention. For example, in some embodiments, eyewear 1300 includes two projectors; one for each eye.

Figure 14:
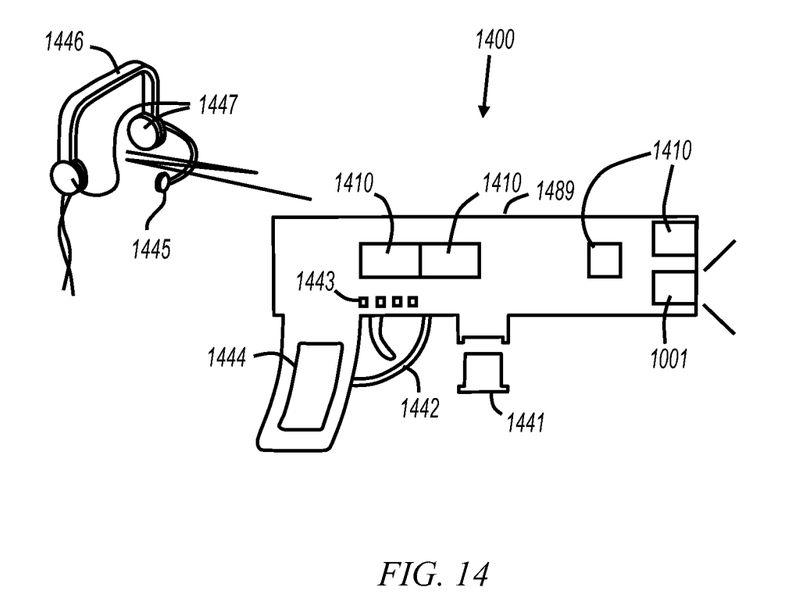
FIG. 14 shows a gaming apparatus in accordance with various embodiments of the present invention.

FIG. 14 shows a gaming apparatus in accordance with various embodiments of the present invention. Gaming apparatus 1400 allows a user or users to observe and interact with a gaming environment. The game is navigated based on the motion, position or orientation of gaming apparatus 1400, an apparatus that includes scanning laser projector 1001. Other control interfaces, such as manually-operated buttons, foot pedals, or verbal commands, may also contribute to navigation around, or interaction with the gaming environment. For example, in some embodiments, trigger 1442 contributes to the illusion that the user or users are in a first person perspective video game environment, commonly known as a "first person shooter game." Because the size and brightness of the projected display can be controlled by the gaming application in combination with the user's movement, gaming apparatus 1400 creates a highly believable or "immersive" environment for these users.

Many other first person perspective simulations can also be created by gaming apparatus 1400, for such activities as 3D seismic geo-prospecting, spacewalk planning, jungle canopy exploration, automobile safety instruction, medical education, etc. Tactile interface 1444 may provide a variety of output signals, such as recoil, vibration, shake, rumble, etc. Tactile interface 1444 may also include a touch-sensitive input feature, such as a touch sensitive display screen or a display screen that requires a stylus. Additional tactile interfaces, for example, input and/or output features for a motion sensitive probe are also included in various embodiments of the present invention.

Gaming apparatus 1400 may also include audio output devices, such as integrated audio speakers, remote speakers, or headphones. These sorts of audio output devices may be connected to gaming apparatus 1400 with wires or through a wireless technology. For example, wireless headphones 1446 provide the user with sound effects via a Bluetooth connection, although any sort of similar wireless technology could be substituted freely. In some embodiments, wireless headphones 1446 may include microphone 1445 or binaural microphone 1447, to allow multiple users, instructors, or observers to communicate. Binaural microphone 1447 typically includes microphones on each ear piece, to capture sounds modified by the user's head shadow. This feature may be used for binaural hearing and sound localization by other simulation participants.

Gaming apparatus 1400 may include any number of sensors 1410 that measure distance, ambient brightness, motion, position, orientation, and the like. For example, gaming apparatus 1400 may detect absolute heading with a digital compass, and detect relative motion with an x-y-z gyroscope or accelerometer. In some embodiments, gaming apparatus 1400 also includes a second accelerometer or gyroscope to detect the relative orientation of the device, or its rapid acceleration or deceleration. In other embodiments, gaming apparatus 1400 may include a Global Positioning Satellite (GPS) sensor, to detect absolute position as the user travels in terrestrial space.

Gaming apparatus 1400 may include battery 1441 and/or diagnostic lights 1443. For example, battery 1441 may be a rechargeable battery, and diagnostic lights 1443 could indicate the current charge of the battery. In another example, battery 1441 may be a removable battery clip, and gaming apparatus 1400 may have an additional battery, electrical capacitor or super-capacitor to allow for continued operation of the apparatus while the discharged battery is replaced with a charged battery. In other embodiments, diagnostic lights 1443 can inform the user or a service technician about the status of the electronic components included within or connected to this device. For example, diagnostic lights 1443 may indicate the strength of a received wireless signal, or the presence or absence of a memory card. Diagnostic lights 1443 could also be replaced by any small screen, such as an organic light emitting diode or liquid crystal display screen. Such lights or screens could be on the exterior surface of gaming apparatus 1400, or below the surface, if the shell for this apparatus is translucent or transparent.

Other components of gaming apparatus 1400 may be removable, detachable or separable from this device. For example, the scanning laser projector may be detachable or separable from gaming housing 1449. In some embodiments, the subcomponents of the scanning laser projector may be detachable or separable from gaming housing 1449, and still function.

Although the present invention has been described in conjunction with certain embodiments, it is to be understood that modifications and variations may be resorted to without departing from the scope of the invention as those skilled in the art readily understand. It is to be clearly understood that the above description is made only by way of example, and not as a limitation on the scope of the invention.

What is claimed is:

1. An apparatus comprising:
a laser light source to create a light beam;
a sinusoidally scanning mirror positioned to reflect the light beam, the sinusoidally scanning mirror having an instantaneous scan phase that sweeps through a zero phase value and positive and negative video extents phase values; and
a brightness compensation component configured to adjust brightness of the light beam using a multi-segment brightness compensation curve comprising at least two functions of the instantaneous scan phase, a first function of the at least two functions being used for a central segment of the multi-segment brightness compensation curve wherein the central segment includes the zero phase value and at least two other values, and a second function of the at least two functions being used for two other segments of the multi-segment brightness compensation curve when an absolute value of the instantaneous scan phase is equal to the positive video extents phase value;
wherein the first function and the second function yield different values for a scan angle value of zero.

2. The apparatus of claim 1 wherein the at least two functions include different coefficients applied to trigonometric functions of the instantaneous scan phase.

3. The apparatus of claim 1 wherein the at least two functions include different offsets summed with trigonometric functions of the instantaneous scan phase.

4. The apparatus of claim 1 wherein the first function is of the form:
brightness_compensation=(CC1*CC2)+(1−CC1)*cos(θ),
where CC1 is a first compensation coefficient, CC2 is a second compensation coefficient, and θ is the instantaneous scan phase.

5. The apparatus of claim 4 wherein the second function is of the form:
brightness_compensation=(CC3*CC4)+(1−CC3)*cos(θ),
where CC3 is a third compensation coefficient, CC4 is a fourth compensation coefficient, and θ is the instantaneous scan phase.

6. The apparatus of claim 5 wherein the brightness compensation component applies the first function when the absolute value of the instantaneous scan phase is below a threshold, and applies the second function when the absolute value of the instantaneous scan phase is above the threshold.

7. The apparatus of claim 6 wherein the threshold corresponds to a knee of a laser class' maximum laser power curve as defined by the International Electrotechnical Commission (IEC).

8. The apparatus of claim 1 wherein the at least two functions consists of two functions.

9. A scanning laser projector comprising:
a scanning mirror to reflect a light beam and paint individual pixels to create an image; and
a brightness compensation component to adjust the brightness of individual pixels based on horizontal distance from a center of the image using a multi-segment brightness compensation curve comprising a plurality of different brightness compensation functions in order to increase overall image brightness while keeping output laser power corresponding to the individual pixels below a laser power limits mask as defined by the International Electrotechnical Commission (IEC);
wherein a first function and a second function of the plurality of different brightness compensation functions yield different values for a scan angle value of zero.

10. The scanning laser projector of claim 9 wherein a first brightness compensation function is used for horizontal distances associated with an instantaneous scan phase below a threshold, and a second brightness compensation function is used for horizontal distances associated with instantaneous phase values above the threshold.

11. The scanning laser projector of claim 10 wherein:
the first brightness compensation function is of the form:
brightness_compensation=(CC1*CC2)+(1−CC1)*cos(θ),
where CC1 is a first compensation coefficient, CC2 is a second compensation coefficient, and θ is the instantaneous scan phase; and
the second brightness compensation function is of the form:
brightness_compensation=(CC3*CC4)+(1−CC3)*cos(θ),
where CC3 is a third compensation coefficient, CC4 is a fourth compensation coefficient, and θ is the instantaneous scan phase.

12. The scanning laser projector of claim 10 wherein the threshold corresponds to a knee of a laser class' maximum laser power limits mask.

13. The scanning laser projector of claim 10 wherein the first and second brightness compensation functions include different coefficients applied to trigonometric functions of the instantaneous scan phase.

14. The scanning laser projector of claim 9 wherein the brightness compensation component uses two different brightness compensation functions.

* * * * *